United States Patent
Abdesselam

(10) Patent No.: US 11,349,407 B2
(45) Date of Patent: May 31, 2022

(54) AC-AC CONVERTER COMPRISING A MATRIX ARRAY OF BIDIRECTIONAL SWITCHES OF PROGRAMMABLE CONFIGURATION

(71) Applicant: THALES, Courbevoie (FR)

(72) Inventor: Francis Abdesselam, Chatou (FR)

(73) Assignee: THALES, Courbevoie (FR)

( * ) Notice: Subject to any disclaimer, the term of this patent is extended or adjusted under 35 U.S.C. 154(b) by 66 days.

(21) Appl. No.: 17/119,928

(22) Filed: Dec. 11, 2020

(65) Prior Publication Data

US 2021/0184589 A1 Jun. 17, 2021

(30) Foreign Application Priority Data

Dec. 17, 2019 (FR) ...................................... 1914591

(51) Int. Cl.
*H02M 5/297* (2006.01)
*H02M 1/12* (2006.01)
*H02M 5/293* (2006.01)
*H02M 1/00* (2006.01)

(52) U.S. Cl.
CPC ........... *H02M 5/297* (2013.01); *H02M 1/126* (2013.01); *H02M 1/0003* (2021.05); *H02M 5/2932* (2021.05)

(58) Field of Classification Search
CPC ........ H02M 5/297; H02M 1/12; H02M 1/126; H02M 5/2932; H02M 1/0003
See application file for complete search history.

(56) References Cited

U.S. PATENT DOCUMENTS

| 2002/0079706 | A1 | 6/2002 | Rebsdorf et al. | |
| 2009/0256419 | A1* | 10/2009 | Anghel | B60L 50/61 |
| | | | | 307/9.1 |
| 2019/0199228 | A1* | 6/2019 | Fornage | H02M 5/225 |

OTHER PUBLICATIONS

Yusoff, et al., "Predictive control of a direct AC/AC matrix converter for power supply applications", 6th IET International Conference on Power Electronics, Machines and Drives (PEMD 2012), Jan. 1, 2012.

(Continued)

*Primary Examiner* — Adolf D Berhane
(74) *Attorney, Agent, or Firm* — BakerHostetler

(57) ABSTRACT

An AC-AC matrix converter that converts an input multiphase periodic voltage includes N input voltages that are out of phase into an output multiphase periodic voltage comprising N output voltages that are out of phase, the converter comprising a square matrix array comprising $N^2$ switches. The converter comprises command and control electronics that periodically perform the following two functions: storing N! voltage summations, each voltage summation corresponding to one switch configuration, each switch configuration relating one and only one out-of-phase input voltage and one and only one out-of-phase reference voltage, each voltage summation being the summation of the N differences in absolute value between one and only one out-of-phase input voltage and one and only one out-of-phase reference voltage; switching the matrix array of switches to apply the configuration corresponding to the lowest voltage summation.

10 Claims, 9 Drawing Sheets

(56) References Cited

OTHER PUBLICATIONS

Rodriguez, et al., "A Review of Control and Modulation Methods for Matrix Converters", IEEE Transactions on Industrial Electronics, vol. 59, Issue 1, pp. 58-70, Jan. 1, 2012.
Gulbudak, et al., "Finite state model predictive control for 3×3 matrix converter based on switching state elimination" 2014 IEEE Energy Conversion Congress and Exposition (ECCE), pp. 5805-5812, Sep. 14, 2014.
Rivera, et al., "A review of predictive control techniques for matrix converter applications", IECON 2017-43 Annual Conference of the IEEE Industrial Electronics Society, IEEE, pp. 7360-7365, Oct. 29, 2017.
Li, et al., "Modulation strategies based on mathematical construction method for matrix converter under unbalanced input voltages", IET Power Electronics, vol. 6, Issue: 3, pp. 434-445, Mar. 2013.

* cited by examiner

AC-AC CONVERTER COMPRISING A MATRIX ARRAY OF BIDIRECTIONAL SWITCHES OF PROGRAMMABLE CONFIGURATION

CROSS-REFERENCE TO RELATED APPLICATIONS

This application claims priority to foreign French patent application No. FR 1914591, filed on Dec. 17, 2019, the disclosure of which is incorporated by reference in its entirety.

FIELD OF THE INVENTION

The field of the invention is that of AC-AC converters. Below, the abbreviation AC is used to mean "alternating current" and the abbreviation DC to mean "direct current". An AC-AC converter converts an input multiphase voltage defined by its frequency and its RMS voltage into an output multiphase voltage having a different frequency and a different RMS voltage.

BACKGROUND

There are various methods allowing such a converter to be produced. By way of first exemplary embodiment, FIG. 1 shows a cycloconverter 1 allowing an input three-phase voltage $T_E$ to be converted into an output three-phase voltage $T_S$. This converter comprises three stages each comprising twelve thyristors 11. The latter turn off when the current flowing through them drops to zero.

By way of second exemplary embodiment, FIG. 2 shows a back-to-back converter 2 allowing an input three-phase voltage $T_E$ to be converted into an output three-phase voltage $T_S$. It comprises a first stage 21 of AC-DC conversion then a second stage 22 of DC-AC conversion.

By way of third exemplary embodiment, FIGS. 3 and 4 show two matrix converters. In the example of FIG. 3, the matrix converter 3 converts an input three-phase voltage into an output three-phase voltage. In the example of FIG. 4, the matrix converter 4 converts an input four-phase voltage into an output four-phase voltage.

A matrix converter essentially comprises:

a first assembly for filtering the input voltage, which assembly is referenced 31 and 41 in FIGS. 3 and 4, respectively;

a matrix array of switches 60, which matrix array is referenced 32 and 42 in FIGS. 3 and 4, respectively;

a second assembly for filtering the output voltage, which assembly is referenced 33 and 43 in FIGS. 3 and 4, respectively.

The publication US 2002/0079706, which is entitled "Variable speed wind turbine having a matrix converter" gives an example of use of this type of AC-AC converter, in which the converter allows a frequency of the output three-phase signal to be kept constant.

If the input voltage comprises N phases and the output voltage M phases, the matrix array of switches comprises N×M switches. Thus, the matrix array of FIG. 3 comprises 9 switches and the matrix array of FIG. 4 comprises 16 switches.

By way of example and as shown in FIG. 5, the switches may consist of silicon or SiC MOS transistors (MOS standing for metal-oxide-semiconductor and SiC silicon carbide). They have been designated by the reference 61 in FIG. 5. The switches may be insulated-gate bipolar transistors (IGBTs). They have been designated by the reference 62 in FIG. 5. The switches may also be silicon or SiC bipolar transistors. They have been designated by the reference 63 in FIG. 5.

The matrix converter has many advantages over other technical solutions. This type of converter has a high efficiency since it requires only a single power stage and generates a low voltage loss. Moreover, the matrix converter may easily be bidirectional. Thus, it is able to convert the input voltage of a source into the output voltage of a load or vice versa.

However, prior-art matrix converters have certain drawbacks. They must be controlled by complex digital components. The control method used is, for example, the MDCM method (MDCM being the acronym of Modulation Duty-Cycle Matrix) or the SVM method (SVM being the acronym of Space Vector Modulation) or a hybrid DCSV method (DCSV being the acronym of Duty-Cycle Space Vector).

Moreover, converter control requires:

network frequency to be measured;

the drop of the network voltage to zero to be measured or the drop of the input current to zero to be measured in order to determine the phase difference between each network voltage and its regulation setpoint.

These measuring methods make this type of AC-AC converter sensitive to various perturbations, which are illustrated in the four graphs of FIG. 6. These four graphs show, as a function of time, the variations in the three voltages T1, T2 and T3 of a three-phase signal. The first graph G1 shows the voltages in the absence of perturbations. The three voltages are perfectly sinusoidal. The second graph G2 shows the same voltages in the presence of rapid voltage variations. The third graph G3 shows the voltages in the presence of distortions and harmonics naturally present in AC distribution networks. These perturbations, which are absent from distribution grids intended to supply domestic or industrial networks, are, in particular, present in aircraft AC-voltage distribution networks, which are intended to supply aircraft AC-AC converters, and in which the generators delivering the AC voltages are of low power (lower than 150 kW). Lastly, the fourth graph shows the voltages in the presence of rapid variations in network frequency.

To decrease the sensitivity of a matrix converter to these various perturbations, the measurement of the network frequency and the evaluation of the phase difference between each network voltage and its regulation setpoint are carried out via a measurement of the network voltages, high-frequency filtering of these measurements, evaluation of the network frequency and use of a phase-locked loop (PLL) to track this frequency. The publication by Xing Li et al. entitled "Modulation strategies based on mathematical construction method for matrix converter under unbalanced input voltages", published in IET Power Electronics (Volume: 6, Issue: 3, March 2013) gives an example of a matrix converter comprising such a phase-locked loop.

By way of example, FIG. 7 shows the architecture of a phase-locked loop 5 that converts a signal at a certain input frequency $F_E$ into a signal at an output frequency $F_S$. This loop comprises:

a phase comparator 51;
a filter 52;
a voltage controlled oscillator (VCO) 53;
a divider by N if the PLL function is digital.

The AC-AC converter according to the invention does not have the above drawbacks. It is based on the following principle: At any given time, there is a switch configuration that minimizes the error between the present input voltages and the desired output voltages.

This principle is shown in FIG. 8. Let an N-phase converter the input voltage of which comprises N components and the output voltage of which comprises N components be considered. The matrix array of switches then comprises $N^2$ switches 60. Each switch may be open or closed. There are therefore $C_{N^2}^N$ possible configurations, or even $$\frac{N^2!}{(N^2-N)! \cdot N!}$$

configurations. The symbol "!" is the conventional factorial symbol. For example, in the case of a three-phase voltage, N being equal to 3, there are 84 possible switch configurations.

It is however necessary to exclude all the configurations that short-circuit the input phases and all the configurations that short-circuit the output phases. In other words, there must be only a single closed switch in each row and each column of the matrix array. In the end, there are N! acceptable switch configurations. In the case of a three-phase voltage there are therefore 6 acceptable configurations, and in the case of a four-phase voltage 24 configurations are acceptable.

For each switch configuration, N summations of voltage differences are carried out. Each voltage difference corresponds to the absolute difference between one of the input voltages and one of the reference voltages. If one of the input voltages is denoted $E_i$ and one of the reference voltages is denoted $Vref_j$, a switch configuration $C_k$ is equal to:

$$C_k = \Sigma_{i,j}^N |E_i - Vref_j|,$$

i and j varying from 1 to N, i and j appearing only a single time in the summation.

The most effective switch configuration corresponds to the minimum summation of voltage differences.

SUMMARY OF THE INVENTION

One subject of the invention is therefore an AC-AC matrix converter that converts an input multiphase periodic voltage comprising N input voltages that are out of phase into an output multiphase periodic voltage comprising N output voltages, said converter comprising a square matrix array comprising $N^2$ switches, wherein the converter comprises command and control electronics that periodically perform at least the two following functions:

storing N! voltage summations, each voltage summation corresponding to one switch configuration, each switch configuration relating N times one and only one input voltage and one and only one reference voltage, a reference voltage corresponding to an expected output voltage, each voltage summation being the summation of the N differences in absolute value between one and only one input voltage and one and only one reference voltage;

switching the matrix array of switches to apply the switch configuration corresponding to the lowest voltage summation.

The invention is based on measurements of the input voltage of the various phases with a view to determining a switch configuration corresponding to the lowest voltage summation and controlling the matrix array of switches depending on this configuration. Thus, the invention takes into account distortions in the various phases when commanding the switches. The invention makes no assumption as to the (sinusoidal) form of the phases of the input voltage. It therefore allows a certain robustness to distortions in the input voltages to be obtained and therefore high-performance regulation to be carried out.

Advantageously, the converter comprises a sample-and-hold module that periodically stores the values of the N! voltage summations at the sampling frequency, said sampling frequency being an order of magnitude higher than the frequency of the input periodic voltage and an order of magnitude higher than the frequency of the output periodic voltage.

Advantageously, the converter comprises determining means that periodically determine, at the sampling frequency, the lowest voltage summation among the N! voltage summations.

Advantageously, the converter comprises a first assembly for filtering the input multiphase voltage, the matrix array of switches, a second assembly for filtering the output multiphase voltage, an electronic control loop and the command and control electronics, the command and control electronics controlling, i.e. commanding, the electronic control loop and the electronic control loop controlling, i.e. commanding, the switching of the matrix array of switches.

Advantageously, the electronic control loop commands the switching of the matrix array of switches in such a way as to command to open and to close each switch defined as being closed in said switch configuration corresponding to the lowest voltage summation, at a chopping frequency and with a duty cycle that are defined by the control loop on the basis of the measurements of the output phase currents, and to keep open each switch defined as being open in said switch configuration corresponding to the lowest voltage summation.

Advantageously, the number N being equal to 3, the input and output voltages are three-phase, the matrix array of switches comprising 9 switches and the number of switch configurations being equal to 6.

Advantageously, the number N being equal to 4, the input and output voltages are four-phase, the matrix array of switches comprising 16 switches and the number of switch configurations being equal to 24.

Advantageously, the frequencies of the input periodic voltage and of the output periodic voltage are comprised between 0.1 Hz and 1000 Hz.

Advantageously, the powers transmitted by said converter are comprised between 1 kW and 1000 kW.

Advantageously, the converter is bidirectional, i.e. the input multiphase periodic voltage is generated by a voltage source and the output multiphase periodic voltage powers a load or vice versa.

BRIEF DESCRIPTION OF THE DRAWINGS

Other features, details and advantages of the invention will become apparent upon reading the description, which is given with reference to the appended drawings, which are given by way of example and in which, respectively.

DETAILED DESCRIPTION

The AC-AC matrix converter according to the invention is applicable to any type of multiphase voltage. However, as has been seen, the number of possible switch configurations increases as the factorial of the number of phases. Thus, below, for the sake of clarity, FIGS. 9 to 13 relate to three-phase voltages, thus limiting the number of switch configurations to 6. For a person skilled in the art, the generalization to voltages comprising more than three phases will present no technical difficulty, the number of configurations to be taken into account simply being higher, the architecture of the converter on the whole remaining the same.

Figure 1:
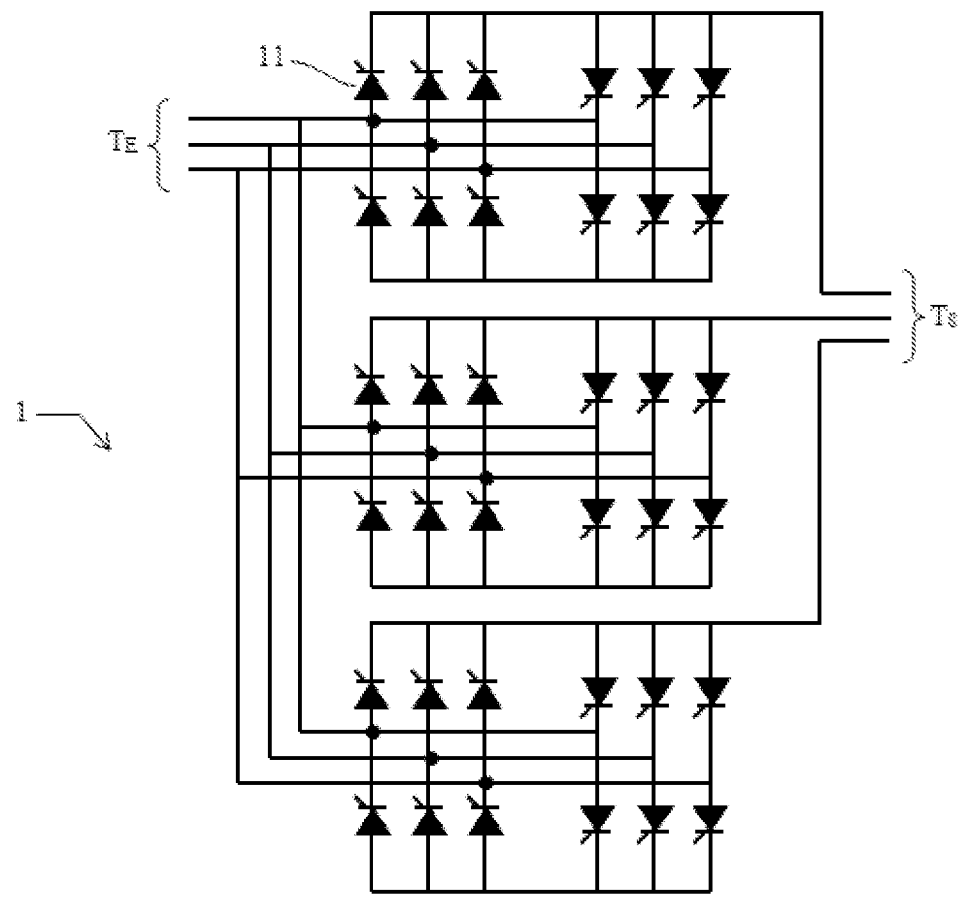
FIG. 1 is an illustration of a first prior-art AC-AC converter.
Figure 2:
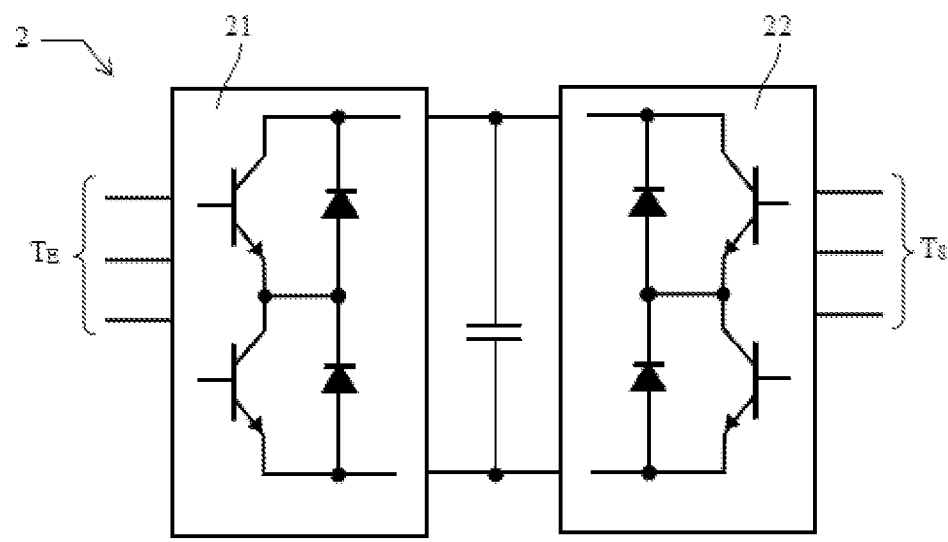
FIG. 2 is an illustration of a second prior-art AC-AC converter.
Figure 3:
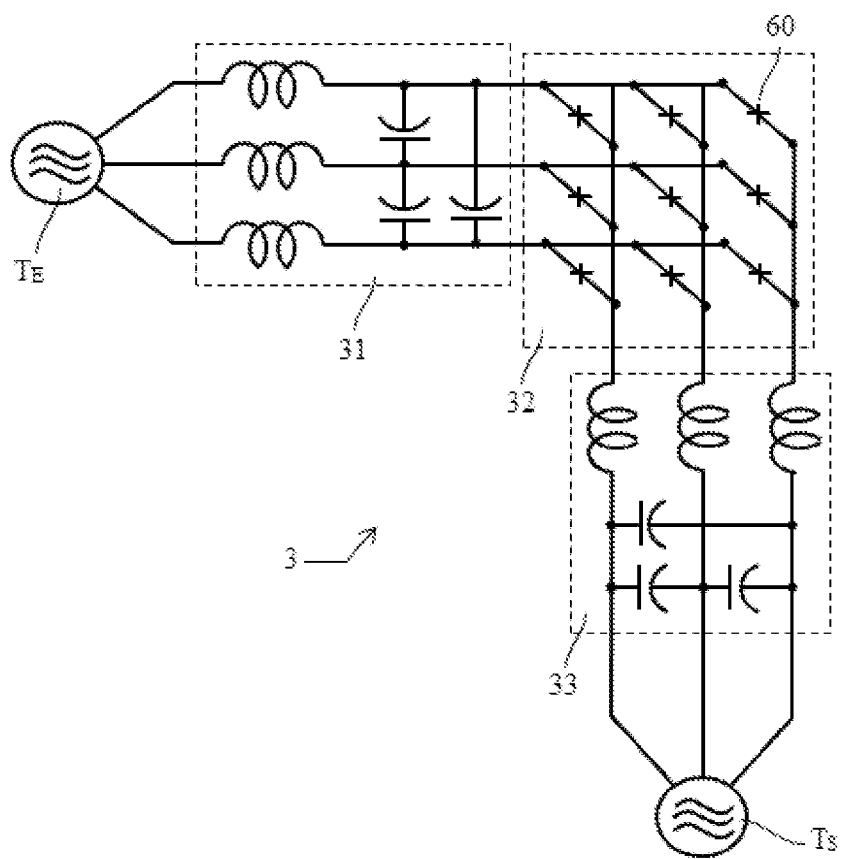
FIG. 3 is an illustration of a three-phase AC-AC matrix converter.
Figure 4:
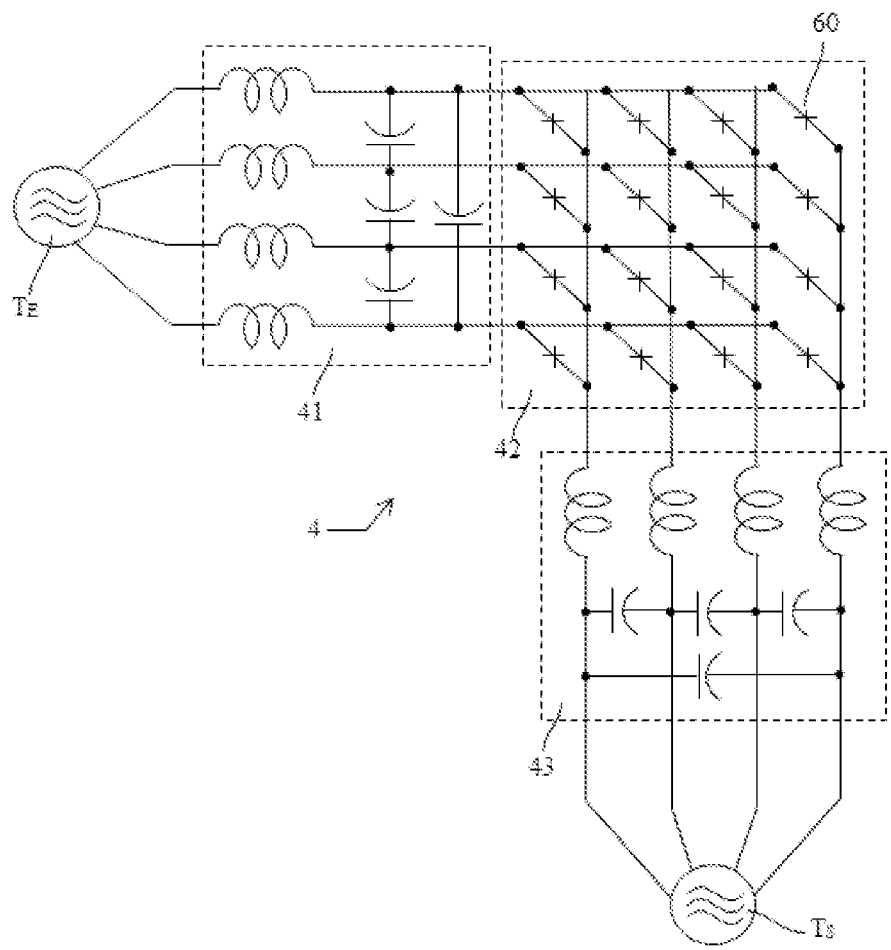
FIG. 4 is an illustration of a four-phase AC-AC matrix converter.
Figure 5:
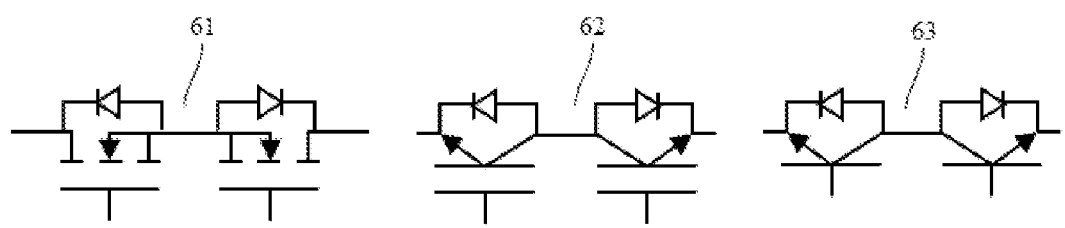
FIG. 5 shows various types of switches of a matrix converter.
Figure 6:
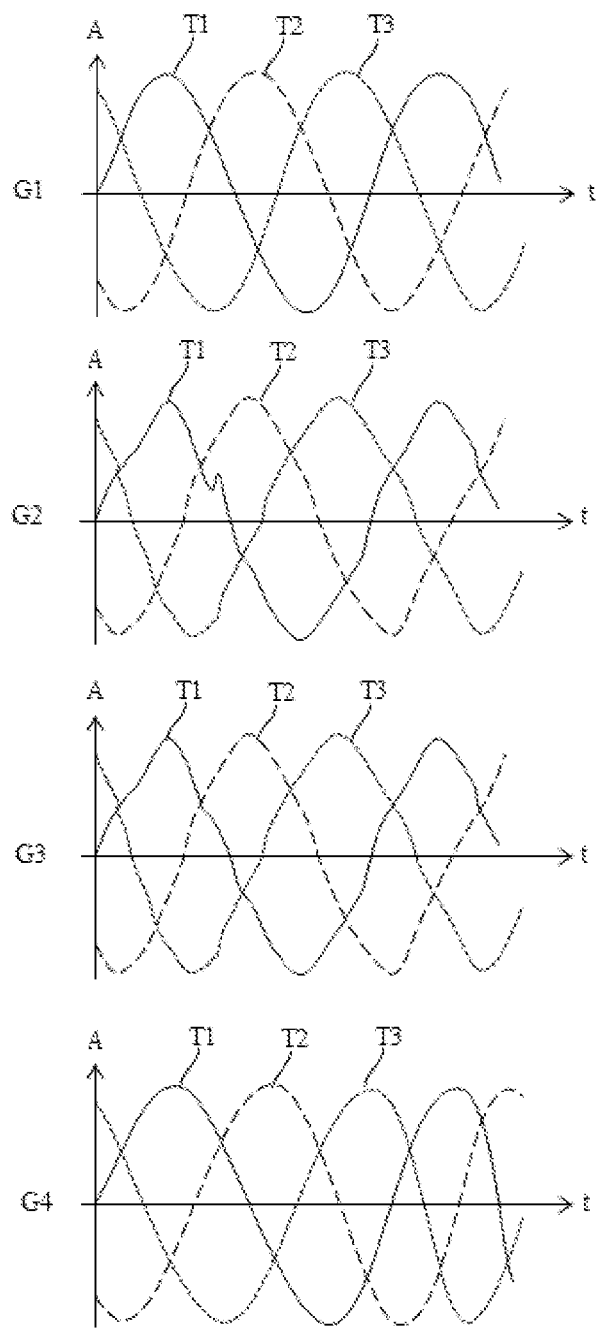
FIG. 6 shows various perturbations of a three-phase signal.
Figure 7:
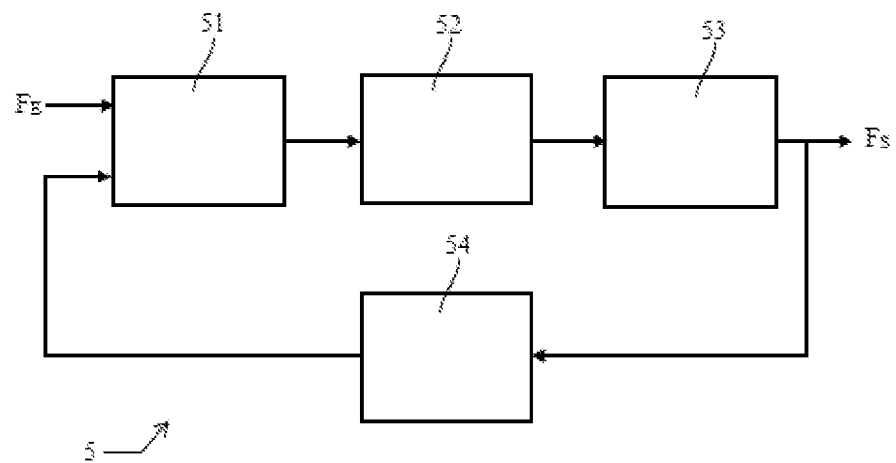
FIG. 7 shows a phase-locked loop (PLL) used in a prior-art matrix converter.
Figure 8:
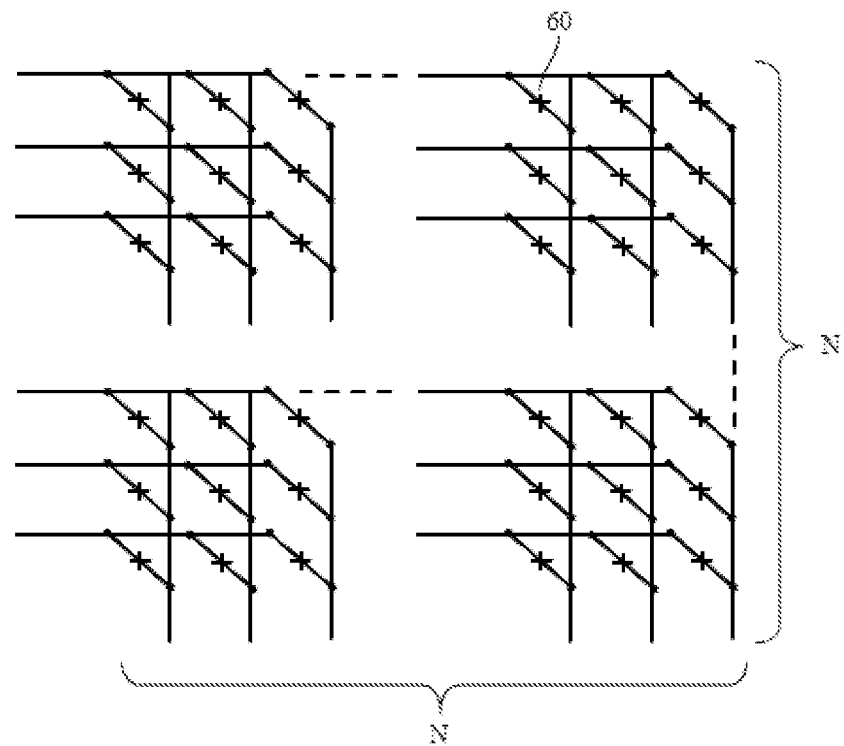
FIG. 8 shows the architecture of a matrix array of switches of a converter according to the invention.
Figure 9:
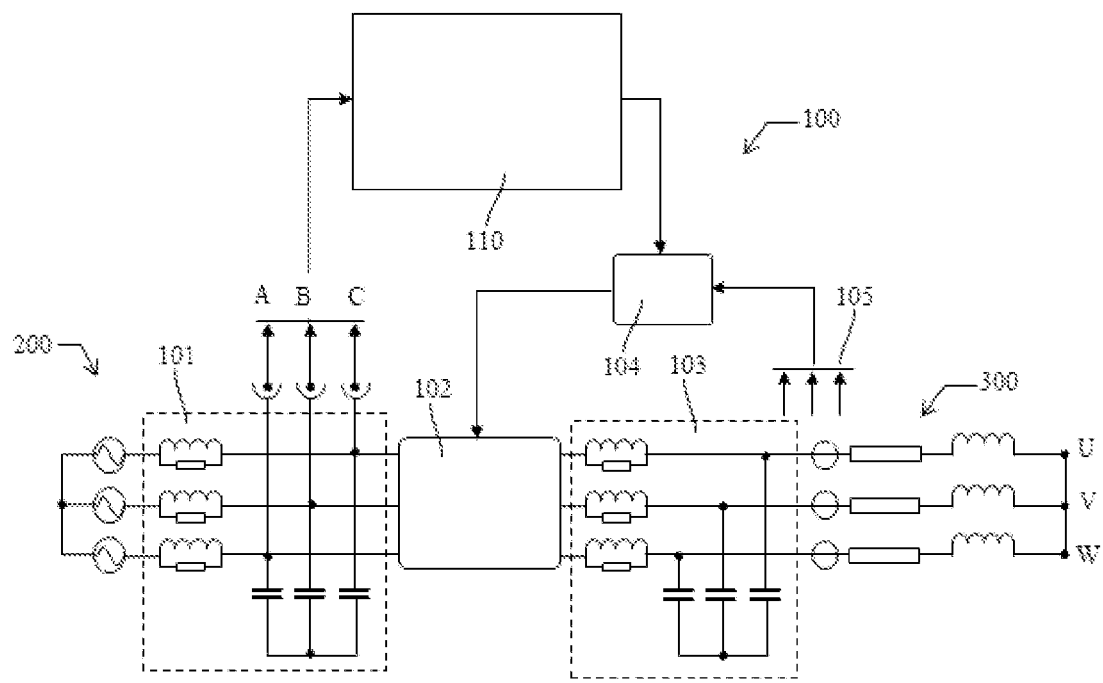
FIG. 9 shows the architecture of a matrix converter according to the invention in the case of three-phase input and output voltages.

FIG. 9 shows the architecture of a matrix converter 100 according to the invention in the case of three-phase input 200 and output 300 voltages. Below, the three phase voltages of the input voltage will be denoted A, B and C, and the three phase voltages of the output voltage will be denoted U, V and W. Furthermore, the values of the three reference voltages at a time t corresponding to a sampling time will be denoted Vu, Vv and Vw, and the values of the three output voltages at the same sampling time t will be denoted Vu, Vv and Vw.

This matrix converter 100 comprises the following elements:
- a first filtering assembly 101;
- a matrix array 102 of switches;
- a second filtering assembly 103;
- command and control electronics 110;
- an electronic control loop 104;
- electronics 105 for measuring currents.

The first filtering assembly 101 is placed between the voltage source 200 and the matrix array 102 switches. The second filtering assembly 103 is placed between the matrix array 102 switches and the load 300. Each filtering assembly comprises three identical filtering devices placed on the three input channels and on the three output channels of the matrix converter. The matrix array 102 of switches comprises three rows of three switches (the latter are not shown in FIG. 9).

The command and control electronics 110 controls, i.e. commands, the electronic control loop 104 or pulse width modulation (PWM), which commands the switches of the matrix array 102 to open and to close at the frequency of the PWM, which is called the chopping frequency.

The electronics of the PWM are also controlled, i.e. commanded, in current-mode via the measurements of current of the electronics 105, i.e. of the phase currents output from the matrix array 102 and as measured by the electronics 105. In other words, the control loop 104 commands the switches of the matrix array 102 to open and to close at the frequency of the PWM on the basis of measurements of the measured phase currents output from the matrix array 102.

The duration of application of the PWM is proportional to the desired current.

In other words, the duty cycle of the PWM is proportional to the desired current.

Figure 11:
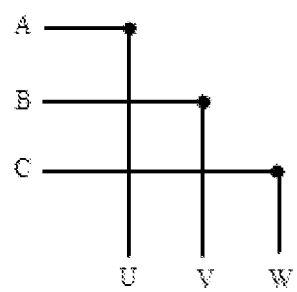
FIG. 11 shows the six switch configurations in the case of three-phase signals.
Figure 11:
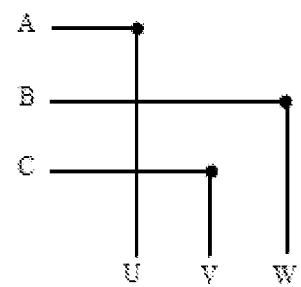
Figure 11:
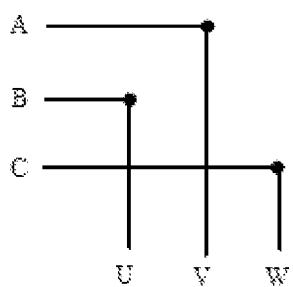
Figure 11:
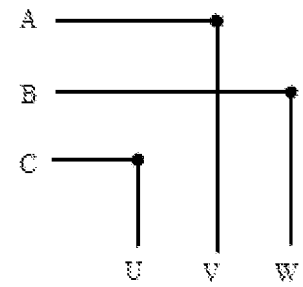
Figure 11:
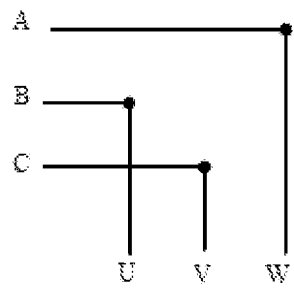
Figure 11:
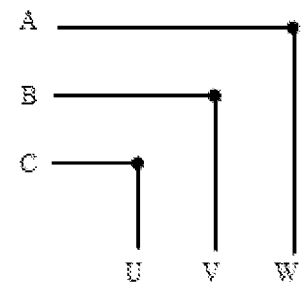

The function of the control loop is to command the switches of the matrix array 102 of switches so as to regulate the output RMS voltage or the output RMS current to a set point RMS voltage or a set point RMS current, respectively. The command and control electronics 110 comprises the following elements:
- three means 111, 112 and 113 for measuring the three input voltages Va, Vb and Vc at a time t corresponding to a sampling time;
- three means 114, 115 and 116 for computing three setpoints Vu, Vv and Vw corresponding to the expected values of the three output voltages at the same sampling time t;
- six means 121 to 126 for computing voltage summations, each voltage summation corresponding to one switch configuration. These various configurations are shown in FIG. 11. They are denoted C1 to C6. More precisely, at each sampling time:

| | |
|---|---|
| $\|Va-Vu\|+\|Vb-Vv\|+\|Vc-Vw\|$ | Configuration C1 |
| $\|Va-Vu\|+\|Vb-Vw\|+\|Vc-Vv\|$ | Configuration C2 |
| $\|Va-Vv\|+\|Vb-Vu\|+\|Vc-Vw\|$ | Configuration C3 |
| $\|Va-Vv\|+\|Vb-Vw\|+\|Vc-Vu\|$ | Configuration C4 |
| $\|Va-Vw\|+\|Vb-Vu\|+\|Vc-Vv\|$ | Configuration C5 |
| $\|Va-Vw\|+\|Vb-Vv\|+\|Vc-Vu\|$ | Configuration C6 |

- the sample-and-hold module 140, the function of which is to periodically keep constant, i.e. to periodically store, at the sampling frequency, the values of the voltage summations. The values of the summations of the voltages, i.e. of the configurations, correspond to the results of the latter computations, which are performed by the computing means 121 to 126 and received by the sample-and-hold module.
- control means 130, which operate at the clock frequency of the sampling, and control, i.e. command, the various electronic control means on each change of sampling time t, the sampling frequency being an order of magnitude higher than the frequency of the input periodic voltage and an order of magnitude higher than the frequency of the output periodic voltage;
- comparing means 150, which compare the values of the six voltage summations computed by the computing means 121 to 126;
- means 160 for determining the lowest voltage sum;
- optionally, means 170 for commanding switching of the switches so as to apply the configuration corresponding to the lowest voltage summation;
- an optional power-controlling interface 180 that implements the preceding commands.

The control means 130 command the means 150, 160 so that the comparing means 150 periodically compare, at the sampling frequency, the values of the voltage summations, and so that the determining means 160 periodically determine, at the sampling frequency, the lowest voltage summation corresponding to the optimal switch configuration.

Figure 10:
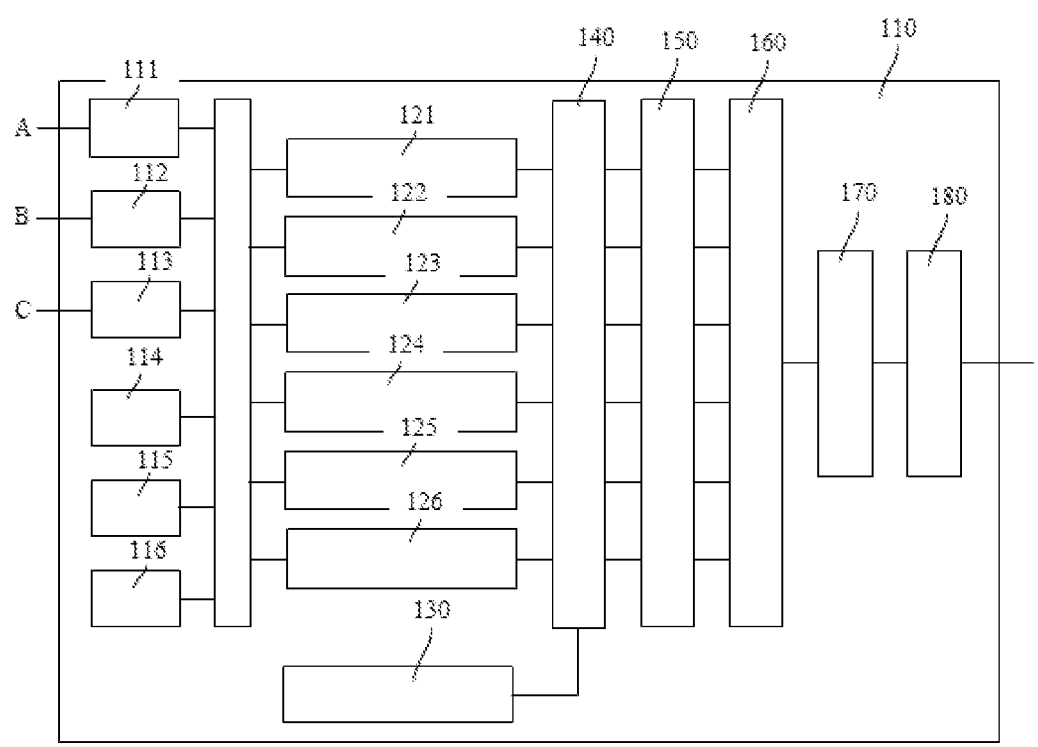
FIG. 10 shows the architecture of the command electronics of a matrix converter according to the invention.
Figure 12:
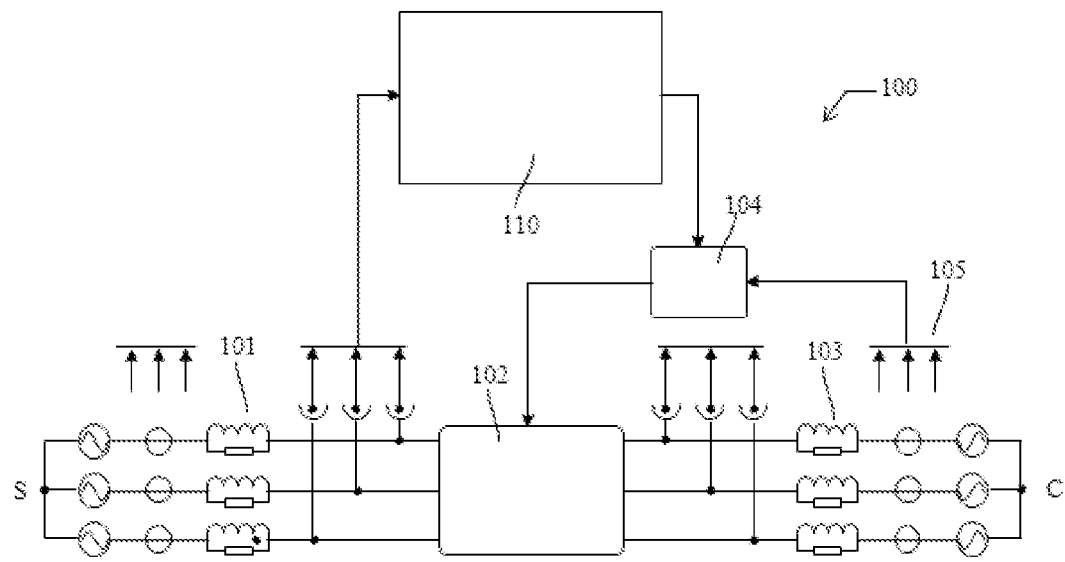
FIG. 12 shows the architecture of the command electronics of a matrix converter according to the invention in the case of source-to-load operation.

In the embodiments in FIGS. 10 and 12, the command and control electronics 110 are devoid of control means 170 and 180.

The control loop 104 receives the lowest voltage determined by the determining means.

In a switch configuration corresponding to the lowest voltage sum, each switch of the matrix array 102 is defined as being, either closed, or open. The control loop 104 is configured to command the switching of the matrix array 102 of switches in such a way as to command to open and to close each switch of the matrix array 102 that is defined as being closed in said switch configuration corresponding to the lowest voltage summation, at a chopping frequency and with a duty cycle that are defined by the control loop on the basis of the measurements of the output phase currents, and to keep open each switch defined as being open in said switch configuration corresponding to the lowest voltage summation. On each change of sampling time, the voltage measurements, the computations and the selection of the best configuration are reiterated, the best configuration possibly being identical to that selected at the preceding time or another configuration.

The frequencies of the periodic input voltage and of the periodic output voltage are preferably comprised between 50 Hz and 1000 Hz, though the converter according to the invention is able to work at lower or higher frequencies.

The powers transmitted by said converter are comprised between 1 kW and 1000 kW, this range of values being nonlimiting.

On account of the operating frequency and power values, the electronic components to be employed present no particular difficulties.

The converter according to the invention may be bidirectional, i.e. the input multiphase periodic voltage is generated by a voltage source and the output multiphase periodic voltage powers a load or vice versa.

Figure 13:
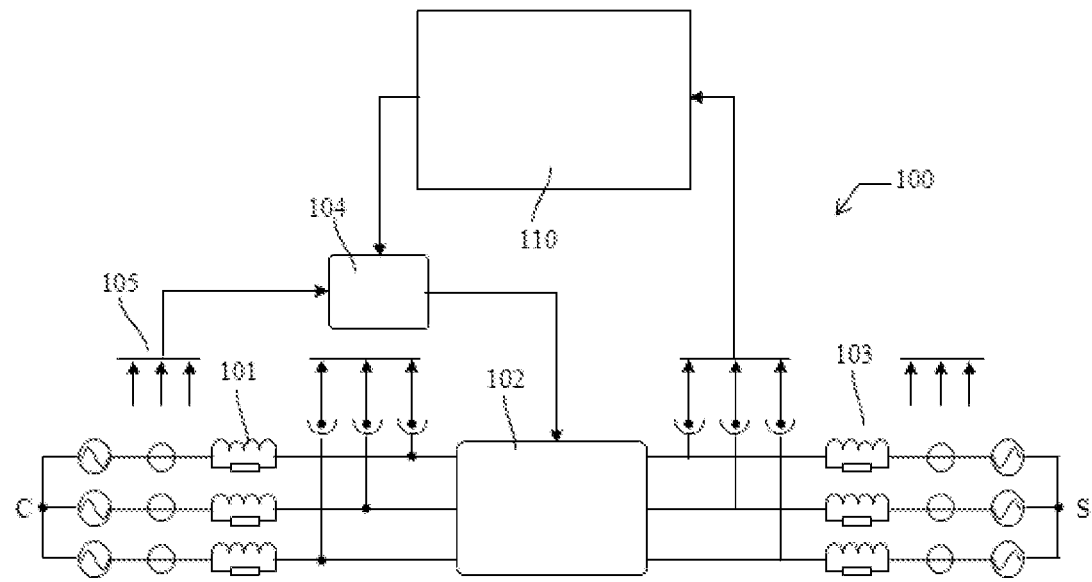
FIG. 13 shows the architecture of the command electronics of a matrix converter according to the invention in the case of load-to-source operation.

FIGS. 12 and 13 illustrate this reversibility. In FIG. 12, the converter is placed between an input source S and an output load C. In FIG. 13, the converter is placed between an input load C and an output source S.

In these two configurations, the structure of the converter is identical. It comprises, as described above, a first filtering assembly 101, a matrix array 102 of switches, a second filtering assembly 103, command and control electronics 110, an electronic control loop 104 and electronics 105 for measuring currents.

In the example detailed above, the voltages were three-phase voltages. When the voltages are four-phase voltages, the architecture of the converter comprises the same elements as that of FIG. 9. The number of switch configurations to compare is simply higher. It increases to 24 configurations. The number of configurations would increase to 120 in the case of voltages comprising five phases and so on.

As one variant, the converter according to the invention is devoid of electronic control loop 104 and optionally of electronics 105 for measuring currents. The switches are then commanded on the basis of the voltage values and not on the basis of measurements of currents output from the matrix array. The command and control electronics 110 then comprise the elements 170 and 180, which are configured to apply the switch configuration corresponding to the lowest voltage summation determined by the means 160.

The invention claimed is:

1. An AC-AC matrix converter that converts an input multiphase periodic voltage comprising N input voltages into an output multiphase periodic voltage comprising N output voltages, said converter comprising a square matrix array comprising $N^2$ switches, wherein the converter comprises command and control electronics that periodically perform at least the two following functions:
    storing N! voltage summations, each voltage summation corresponding to one switch configuration, each switch configuration relating N times one and only one input voltage and one and only one reference voltage, a reference voltage corresponding to an expected output voltage, each voltage summation being the summation of the N differences in absolute value between one and only one input voltage and one and only one reference voltage
    switching the matrix array of switches to apply the switch configuration corresponding to the lowest voltage summation.

2. The AC-AC matrix converter as claimed in claim 1, wherein the converter comprises a sample-and-hold module that periodically stores, at the sampling frequency, the N! voltage summations, said sampling frequency being an order of magnitude higher than the frequency of the input periodic voltage and an order of magnitude higher than the frequency of the output periodic voltage.

3. The AC-AC matrix converter as claimed in claim 2, comprising determining means that periodically determine, at the sampling frequency, the lowest voltage summation among the N! voltage summations.

4. The AC-AC matrix converter as claimed in claim 2, wherein the converter comprises a first assembly for filtering the input multiphase voltage, the matrix array of switches, a second assembly for filtering the output multiphase voltage, an electronic control loop and the command and control electronics, the command and control electronics controlling the electronic control loop and the electronic control loop controlling the switching of the matrix array of switches.

5. The AC-AC matrix converter as claimed in claim 4, wherein the electronic control loop is configured to command the switching of the matrix array of switches in such a way as to command to open and to close each switch defined as being closed in said switch configuration corresponding to the lowest voltage summation, at a chopping frequency and with a duty cycle that are defined by the control loop on the basis of the measurements of the output phase currents, and to keep open each switch defined as being open in said switch configuration corresponding to the lowest voltage summation.

6. The AC-AC matrix converter as claimed in claim 1, wherein the number N being equal to 3, the input and output voltages are three-phase, the matrix array of switches comprising 9 switches and the number of switch configurations being equal to 6.

7. The AC-AC matrix converter as claimed in claim 1, wherein the number N being equal to 4, the input and output voltages are four-phase, the matrix array of switches comprising 16 switches and the number of switch configurations being equal to 24.

8. The AC-AC matrix converter as claimed in claim 1, wherein the frequencies of the input periodic voltage and of the output periodic voltage are comprised between 0.1 Hz and 1000 Hz.

9. The AC-AC matrix converter as claimed in claim 1, wherein the powers transmitted by said converter are comprised between 1 kW and 1000 kW.

10. The AC-AC matrix converter as claimed in claim 1, wherein the converter is bidirectional, i.e. the input multiphase periodic voltage is generated by a voltage source and the output multiphase periodic voltage powers a load or vice versa.

* * * * *